United States Patent [19]

Schuler

[11] 4,166,871

[45] Sep. 4, 1979

[54] IODINE STAINED LIGHT POLARIZER

[75] Inventor: Norman W. Schuler, Lexington, Mass.

[73] Assignee: Polaroid Corporation, Cambridge, Mass.

[21] Appl. No.: 900,728

[22] Filed: Apr. 27, 1978

Related U.S. Application Data

[63] Continuation of Ser. No. 810,996, Jun. 29, 1977, abandoned.

[51] Int. Cl.$^2$ .......................... G02B 1/08; G02B 1/10; G02B 5/30
[52] U.S. Cl. .................................. 427/163; 350/154; 350/155
[58] Field of Search ................ 427/160, 163; 350/154, 350/155

[56] References Cited

U.S. PATENT DOCUMENTS

| Re. 23,297 | 11/1950 | Hyman et al. | 350/154 |
| 2,237,567 | 4/1941 | Land | 350/155 |
| 2,328,219 | 8/1943 | Land | 350/154 |
| 2,375,963 | 5/1945 | Thomas | 350/154 X |
| 2,554,850 | 5/1951 | Binda | 350/154 |

*Primary Examiner*—James R. Hoffman
*Attorney, Agent, or Firm*—Louis G. Xiarhos

[57] ABSTRACT

A visible range light polarizer is prepared by staining an oriented film of polyvinyl alcohol with a solution containing iodine and its red light dichroism is enhanced by treating the stained film with a boric acid solution containing a zinc salt.

12 Claims, 6 Drawing Figures

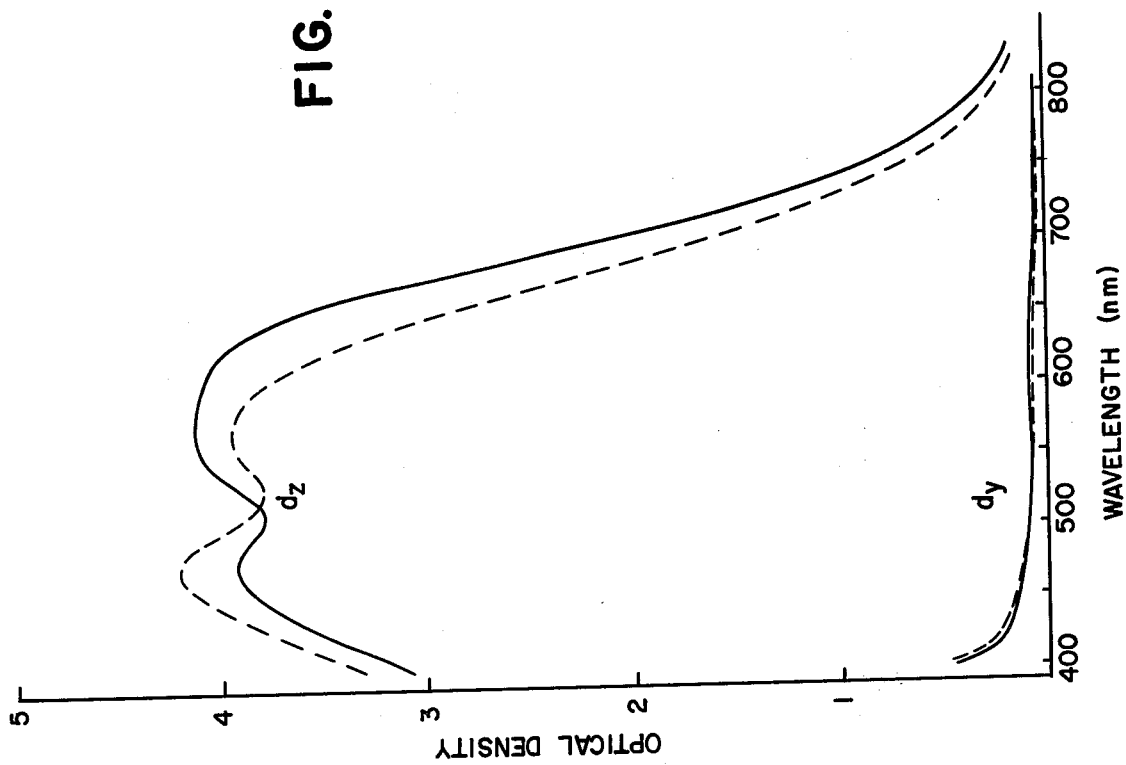

IODINE STAINED LIGHT POLARIZER

CROSS-REFERENCE TO RELATED APPLICATION

This application is a continuation of my earlier filed and copending application Ser. No. 810,996 filed June 29, 1977, and now abandoned.

BACKGROUND OF THE INVENTION

Linear light polarizers in general owe their properties of selectively passing radiation vibrating along a given electromagnetic radiation vector and adsorbing electromagnetic radiation vibrating along a second given electromagnetic radiation vector to the anisotropic character of the transmitting medium. Dichroic polarizers are linear polarizers of the absorptive variety; that is they owe their polarizing capabilities to the vectorial anisotropy of their absorption of incident lightwaves. Light entering a dichroic medium encounters two different absorption coefficients, one low and one high. The emerging light vibrates predominantly in the direction of low absorption.

The most widely used type of synthetic polarizer, which is the polarizer to which the present invention is directed, is the polyvinyl alcohol-iodine complex polarizer. It consists of linear polyiodide contained within a polyvinyl alcohol helix. By orienting the polyvinyl alcohol matrix unidirectionally the transition moments of the absorbers are also so oriented and the material becomes visibly dichroic.

Polyvinyl alcohol film polarizers generally comprise a plastic support which may be any suitable isotropic material, and preferably cellulose acetate butyrate. The support gives the film dimensional stability and additionally serves as a cover or protective element. It must naturally be transparent.

The manufacture of iodine stained dichroic light polarizing elements, which involves stretching polyvinyl alcohol and subsequently dyeing the material with a dichroic stain containing iodine, is well known and is disclosed, for example, in U.S. Pat. No. 2,237,567 of Edwin H. Land issued on Apr. 8, 1941. In accordance with that patent it is disclosed that a cast sheet or film of polyvinyl alcohol is first formed from an aqueous solution of the material. The dried cast sheet is then heated to a temperature at which it can be extended by stretching, preferably in a moist atmosphere. It is further disclosed in that patent that the stretched sheet may be bonded to a supporting sheet, as has been discussed above. After the stretched sheet is cooled, a dichroic sheet may be applied to one or both surfaces of the sheet.

In a later patent issued to Alexander Thomas on May 15, 1945, U.S. Pat. No. 2,375,963, an improvement in the process of making an iodine stained polarizer is described and essentially comprises washing the polarizer after the step involving staining with iodine. This results in removing uncombined iodine and forming a more stable product.

A major improvement in the above light polarizing element is explained in U.S. Pat. No. Re. 23,297 issued on Nov. 28, 1950 to Mark Hyman, Jr. et al. That improvement comprises a protective surface layer on the iodine stained polyvinyl alcohol light polarizer. That surface layer comprises an ester of polyvinyl alcohol, the ester being of a polybasic acid or a derivative of such an acid, particularly an inorganic polybasic acid, and more particularly boric acid, thereby providing a hybrid form of polyvinyl alcohol-polyvinyl borate. This borating step is disclosed to provide greatly improved stability to the light polarizer not only against heat but also against moisture and ultraviolet radiation. It is accomplished by treating the stained polarizing element with a boric acid solution. Specifically the ester formed on the surface of the light polarizer is believed to be polyvinyl orthoborate. The esterification reaction may be accompanied by some decrease in the degree of molecular orientation and loss of stain in the reacted layer. This in turn may cause a loss in the dichroism of the sheet and a deterioration in transmission running as high as from 5 to 10 percent of incident light. The predominant color of the sheet also changes toward the blue-that is the sheet becomes less efficient in its overall blue adsorption.

The diminution in the blue dichroic absorption or darkening of borated polarizer can be prevented by eliminating the iodine from so much of the surface layer of the sheet as will be penetrated by the boric acid solution. One way of eliminating this iodine is to wash the sheet with water after staining and before treatment with the boric acid solution. A superior technique for avoiding the loss of blue absorption involves incorporating a high level of potassium iodide in the borating solution. Apparently this reinforces the dichromophore responsible for absorption in the blue range. After the material has been borated and dried, excellent blue dichromophore stability and a high level of blue absorption is maintained. However, a significant instability which results in a drop-off in red light adsorption results on heating, thereby producing a significant "red leak" which is particularly noticeable when two such polarizers are in the crossed position. The "red leak" is quite noticeable, particularly in polarizers with low light leakage at the lower end of the spectrum, i.e., the blue end.

SUMMARY OF THE PRESENT INVENTION

By the present invention the aforenoted "red leak" problem of prior art iodine stained polyvinyl alcohol light polarizing elements is substantially eliminated by incorporating zinc ion in the form of a stabilizing zinc salt, such as zinc chloride, zinc iodide, zinc sulfate, etc. into the polarizer after staining. The stabilizing salt preferably comprises zinc chloride and is applied in the borating solution.

It has been found that in addition to providing heat and moisture stability, the boric acid solution prevents the iodine stain from being removed from the sheet during processing. If the iodine stained material is treated merely with a solution containing potassium iodide and zinc chloride and no boric acid, much of the active iodine is removed.

The dichroic complex formed by polyvinyl alcohol and iodine occurs in a family of varying chain lengths, for example, triiodide, pentaiodide, etc. Since the spectral position of the absorption peaks depends upon the dichromophore chain lengths it can be seen that there will be an optimum relative concentration of short and long chain units resulting in the highest efficiency for the various segments of the visible region.

It is theorized that the presence of zinc ion in the polarizer retards degradation on heating of the dichromophore responsible for red absorption. This dichroic red degradation is apparently increased by the potassium iodide acting in conjunction with the dichromophore responsible for blue absorption. Accordingly the zinc ion apparently stabilizes the red absorption of iodine-stained polarizers of the present invention and inhibits degradation on heating of the dichromophore responsible for such absorption.

Applicant is aware of the fact that zinc chloride has been employed in a redox system in the manufacture of iodine stained light polarizing elements and such use is described in U.S. Pat. No. 2,328,219 issued on Aug. 31, 1943 to Edwin H. Land. The Land system describes immersing a cellophane sheet into a solution comprising potassium iodide and zinc chloride prior to contacting the sheet with iodine stain. In other words, the prior art use of zinc chloride in manufacturing light polarizing elements occurs before the material is stained and not after, as is required by the present invention. In order to distinguish the results achieved by the present invention and those achieved by the aforementioned U.S. Pat. No. 2,328,219, that is with a system in which the zinc chloride is not added to the sheet after staining, applicant has conducted an experiment in which zinc chloride is contained in the iodine stain bath, and will discuss below the results obtained and differences between those results and the results achieved with the present invention.

In general in manufacturing the light polarizing element of the present invention a polyvinyl alcohol sheet from 0.038 to 0.051 mm in thickness is stretched unidirectionally by techniques well known to the art to between 3.5 and 4 times its normal dimensions. The stretched polyvinyl alcohol sheet is laminated to one side of a layer of cellulose acetate butyrate which is between 0.127 and 0.343 mm in thickness. The cellulose acetate butyrate sheet may have on its surface opposed to its surface laminated to the stretched polyvinyl alcohol a mar resistant coating as is disclosed, for example, in U.S. Pat. No. 3,097,106. The cellulose acetate butyrate may be laminated to the polyvinyl alcohol sheet by any suitable method known to the art and in particular may be laminated by means of any suitable adhesive; but preferably one comprising a solution of polyvinyl alcohol. In addition the cellulose acetate butyrate materials may contain isotropic dyes which provide cosmetic functionality such as tinting the polarizer, etc.

The exposed side of the stretched polyvinyl alcohol is next passed over the surface of an iodine staining bath and essentially floats along the surface. The bath is preferably a mixture of iodine, potassium iodide and water, which is more specifically described below. Excess iodine stain is wiped off and the sheet is then floated on a borating composition bath containing potassium iodide, boric acid, zinc chloride and water. It is next wiped dry, baked, and may then be laminated to another sheet of cellulose acetate butyrate to provide total protection on both sides of the polarizer.

DESCRIPTION OF THE DRAWINGS

FIG. 6 depicts the optical density of an iodine stained light polarizer when zinc chloride is added to the iodine bath while only potassium iodide is present in the borating solution, as a function of wavelength.

DESCRIPTION OF THE PREFERRED EMBODIMENT

A film of polyvinyl alcohol approximately 1.5 mils in thickness is uniaxially stretched to 3.6 times its original dimension. The stretched sheet is then laminated to a sheet of cellulose acetate butyrate upon which is coated a film of polyethyleneglycol dimethylacrylate consistent with the procedure described in U.S. Pat. No. 3,097,106. The cellulose acetate butyrate is laminated to the polarizer by means of a suitable adhesive, e.g. an adhesive comprising polyvinyl alcohol, methanol, a crosslinking agent and water and is preferably 0.381 mm in thickness.

Figure 1:
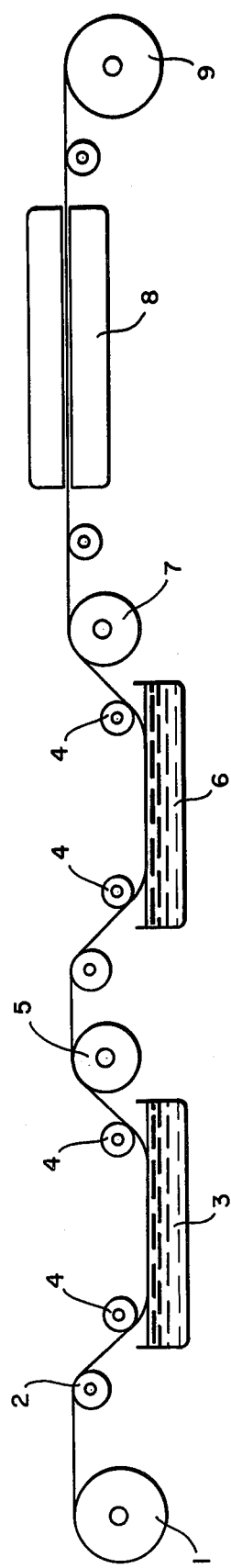
FIG. 1 is a schematic illustration of the process of the present invention.
Figure 3:
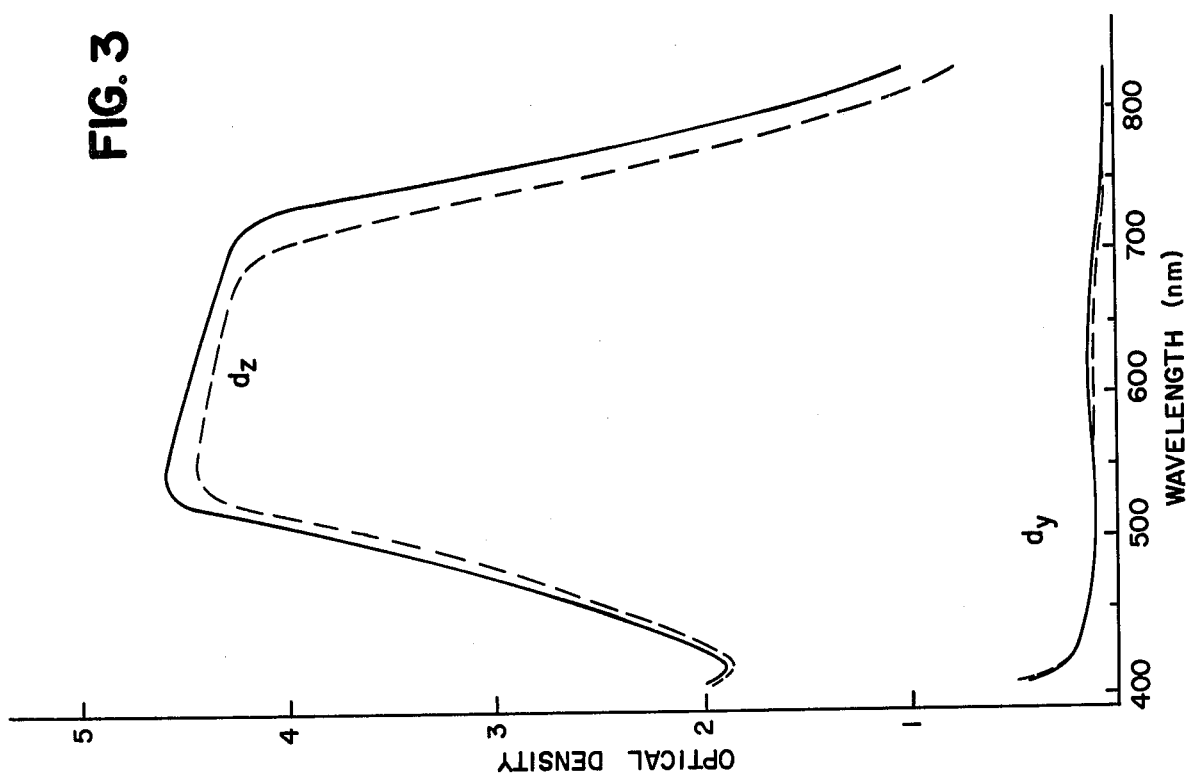
FIG. 3 is similar to FIG. 2 and depicts the optical density of an iodine stained polarizer as a function of wavelength when zinc chloride alone is added to the borating solution.

Referring now to FIG. 1, a roll of laminated, stretched polyvinyl alcohol-cellulose acetate butyrate material 1 is conducted over a suitable roll 2 and drawn across the surface of an iodine stain bath 3. The polyvinyl alcohol layer is in contact with the surface of the bath and the cellulose acetate butyrate layer is the upper layer and generally held out of contact with the surface of the bath. Rolls 4 are mere guide rolls and do not effect the floating of the layer across the surface of the bath. The composition of the iodine stain is iodine, potassium iodide and water preferably in a ratio of 1/15.82/328 by weight. The temperature of the bath is held at 35° C. and the residence time of any given point on the web across the surface of the bath is about 15 seconds. As the web leaves the bath, it is drawn across wiper 5 which may be no more than a damp towel and is then directed to bath 6 where, in a manner similar to its treatment in bath 3, it is drawn across the surface of a borating composition comprising potassium iodide, boric acid, zinc chloride and water, preferably in a ratio of 1.95/1.25/1/25.67 by weight. The temperature of the borating bath is about 165° F. and the residence time of any given point of the web in the bath is 25 to 30 seconds. After leaving this bath, the web contacts a second wiping station 7 which is preferably a porous roll with toweling on the outside and vacuum applied inside the roll. To keep the roll damp a gentle water spray is applied to its outside surface. After being toweled dry the web is directed through oven 8 where it is exposed to air currents of about 94° C. to dry the web. It is then rerolled at station 9.

Samples of light polarizing material made essentially as described above but with changes in the formulations of the two baths were exposed to 75° C. dry heat for a period of 15 hours in order to determine the heat stability of the polarizers. In the following example, various polarizers are compared and in particular their optical densities across the visible spectrum are depicted in FIGS. 2 through 6 of the drawings, demonstrating without a doubt the advantages of the polarizer of the present invention over both polarizers of the prior art and polarizers made with modifications to prior art techniques.

EXAMPLE I

Light polarizing elements were produced in accordance with the scheme described with respect to FIG. 1 with the following changes:

Film 1. This film was exposed to a first bath containing iodine and potassium iodide and a second bath in which both the potassium iodide and zinc chloride were omitted. The first bath accordingly comprised iodine, potassium iodide, and water in a weight ratio of 1/15.82/328 and the second bath comprised boric acid and water in a weight ratio of 1/20.54.

Film 2 was manufactured with a first bath which, like film 1 comprised iodine, potassium iodide and water in a weight ratio of 1/15.82/328; and a second bath which comprised boric acid, zinc chloride and water in a weight ratio of 1.25/1/25.67.

Film 3 was prepared with a first bath which, like the first two films, contained iodine, potassium iodide and water in a weight ratio of 1/15.82/328; and a second bath which contained boric acid, potassium iodide and water in a weight ratio of 1/1.56/20.54.

Film 4, like the first three films, was exposed to a first bath containing iodine, potassium iodide and water in a weight ratio of 1/15.82/328; and a second bath which contained boric acid, potassium iodide, zinc chloride and water in a weight ratio of 1.25/1.95/1/25.67.

Film 5 was exposed to a first bath comprising iodine, potassium iodide, zinc chloride and water in a weight ratio of 1/15.82/12/328; and a second bath which contained boric acid, potassium iodide and water in a weight ratio of 1/1.56/20.54.

After the respective films were dried, samples were exposed to 75° C. dry heat for 15 hours and the exposed samples were analyzed on a Cary 14 spectrophotometer to determine the optical density of the light polarizing element as a function of wavelength. The respective optical densities are depicted in FIGS. 2 through 6 of the drawings. In each instance the solid line represents the optical density of the sample prior to being exposed to 15 hours of 75° C. dry heat and the dashed lines indicate the response of the sample after exposure for 15 hours to 75° C. dry heat. The curves labeled $d_z$ relate to the optical density obtained when the transmission axis of the sample polarizer is crossed with the polarization axis of the spectrophotometer polarizer and curves labeled $d_p$ indicate the response of the sample polarizer when its transmission axis is parallel to the polarization axis of the spectrophotometer polarizer.

Figure 2:
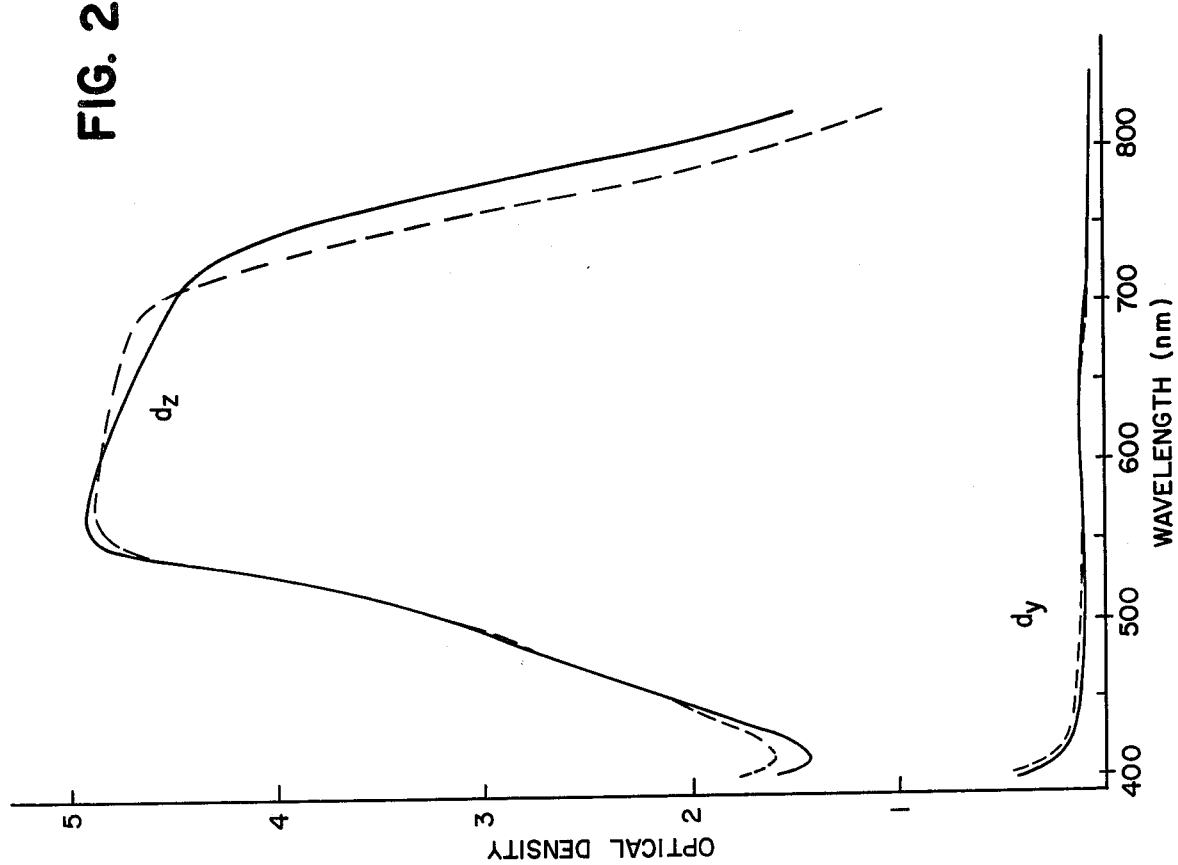
FIG. 2 is a curve of optical density of iodine stained light polarizer which has gone through a borating solution which does not contain a "red-leak" stabilizing salt or potassium iodide, versus wavelength.

Referring first to FIG. 2, it is clear that both the curve before and after heating show significant blue leakage in the crossed position. This is also true of the curve of FIG. 3 except that it is now evident that the zinc chloride has significantly raised the optical density of the polarizer in the red region which is in fact the effect that the present invention is intended to achieve.

Figure 4:
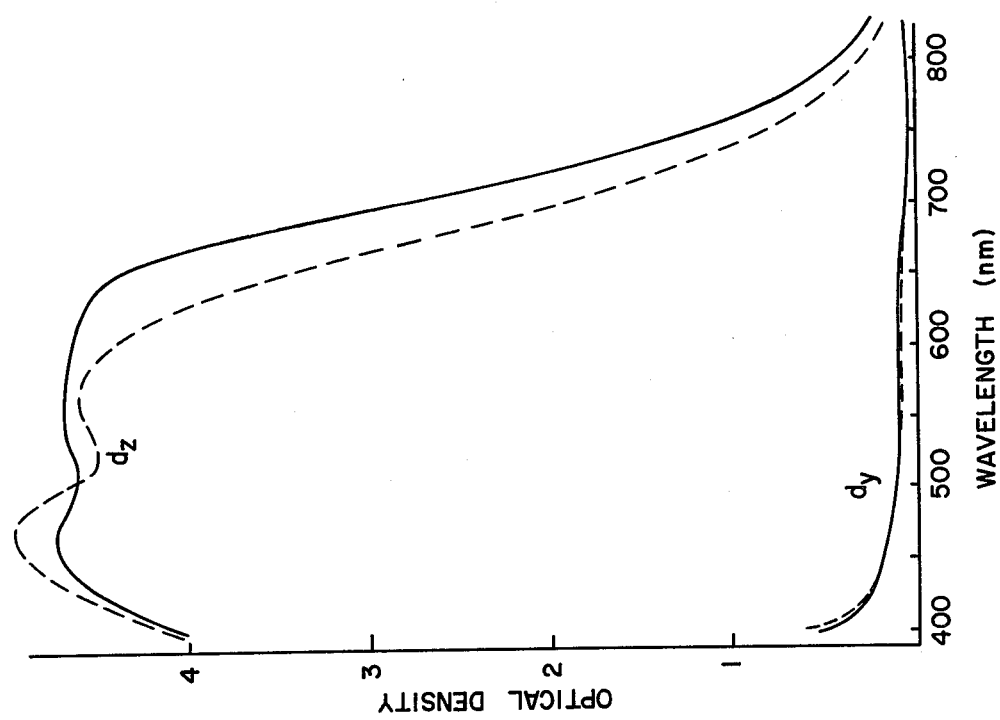
FIG. 4 like FIG. 3 shows the optical density of an iodine stained polarizer as a function of wavelength when only potassium iodide is added to the borating solution.

Looking now at FIG. 4 the presence of the potassium iodide has substantially eliminated blue leakage in both the before and after-heated polarizers. However, red absorbance is lower than was noted in FIG. 3.

Figure 5:
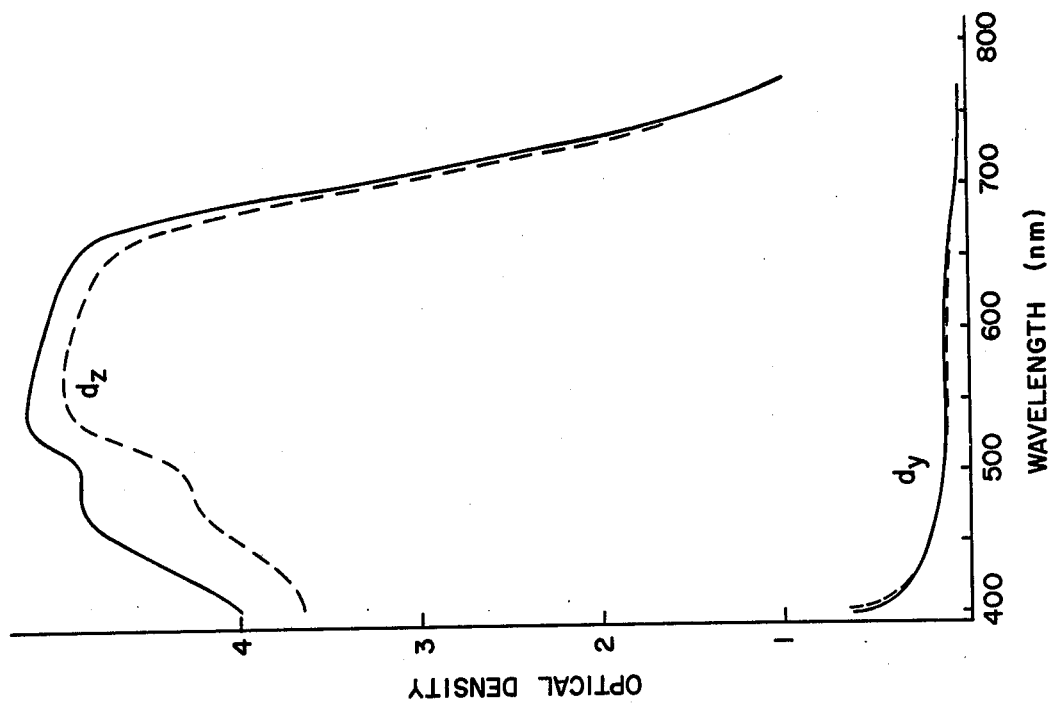
FIG. 5 depicts the optical density of the polarizer of the present invention when both potassium iodide and zinc chloride are added to the borating solution, as a function of wavelength.

FIG. 5 which depicts the optical density versus wavelength of the preferred polarizer of the present invention, demonstrates that by including zinc chloride along with potassium iodide in the borating solution the "blue leak" is substantially reduced and the red response or reduction of the "red leak" is maximized.

Note particularly that at 750 nm the optical density of the polarizer of FIG. 5 is over 1.5 while the optical density of the polarizer of FIG. 4 at 750 nm is under 1.

The curves of FIG. 6 clearly show that it does make a difference when the zinc ion is added. It is not enough that zinc ion is applied someplace in the manufacture of an iodine stained polarizer, it must be applied subsequent to the iodine staining step. Comparing FIG. 6, for example, to FIG. 4 one cannot help but appreciate the similarity between the two curves. After the heat stability treatment they are in fact nearly identical. What can be concluded from this is that the zinc ion, when present in the stain, did not have much of an effect on the optical response of the polarizer. If anything, it lowered the blue absorbance.

By the present invention a highly efficient light polarizing element has been prepared which finds utility not only in conventional situations but in some unconventional situations, where as close to absolute extinction as is possible is required in the crossed position as in, for example, flash blindness goggles, such as might be employed by welders and others exposed to sudden bursts of extremely bright visible radiation which is potentially harmful to the eyes.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A method of preparing a light polarizing element which comprises:
    uniaxially stretching a film of polyvinyl alcohol; and
    staining the stretched film with an iodine solution; and
    treating the stained film with an aqueous solution containing zinc ion in a concentration effective to stabilize absorption of red light by the polarizer against degradation on heating.

2. The method of claim 1 wherein the stained film is treated with an aqueous solution of boric acid.

3. The method of claim 2 wherein said solution of boric acid additionally contains potassium iodide.

4. The method of claim 2 wherein said boric acid solution contains said zinc ion.

5. The method of claim 4 wherein said zinc ion results from dissolving zinc chloride in said solution.

6. A method of preparing a light polarizing element which comprises:
    uniaxially stretching a film of polyvinyl alcohol; and
    staining the stretched film with an iodine solution; and
    treating the stained film with an aqueous borating solution containing zinc ion in a concentration effective to stabilize absorption of red light by the polarizer against degradation on heating.

7. The method of claim 6 wherein said aqueous borating solution containing zinc ion additionally contains potassium iodide.

8. The method of claim 7 wherein said aqueous borating solution comprises boric acid.

9. In a light polarizing sheet comprising a uniaxially stretched film of polyvinyl alcohol stained with iodine, the improvement wherein said film comprises zinc ion which is absorbed by said film after it is stained with iodine, in a concentration whereby absorption of red light by said polarizer is stabilized against degradation on heating.

10. The polarizer of claim 9 which additionally comprises a complex of said polyvinyl alcohol and boric acid.

11. The polarizer of claim 10 which additionally comprises potassium iodide.

12. The polarizer of claim 9 which additionally comprises potassium iodide.

* * * * *